United States Patent [19]

Kreischer

[11] Patent Number: 4,561,733

[45] Date of Patent: Dec. 31, 1985

[54] PANORAMIC UNITY VISION SYSTEM

[75] Inventor: Cody B. Kreischer, Palatine, Ill.

[73] Assignee: Recon/Optical, Inc., Barrington, Ill.

[21] Appl. No.: 601,387

[22] Filed: Apr. 17, 1984

[51] Int. Cl.⁴ .......................... G02B 23/02; G02B 5/08
[52] U.S. Cl. ..................................... 350/618; 350/617; 350/602; 350/575
[58] Field of Search ............... 350/617, 618, 623, 631, 350/622, 624, 602, 541, 542, 557, 575, 1.1, 601

[56] References Cited

U.S. PATENT DOCUMENTS

| | | | |
|---|---|---|---|
| 749,754 | 11/1964 | Spear | 350/541 |
| 1,708,746 | 4/1929 | Von Hofe | 350/541 |
| 3,001,449 | 9/1961 | Hyde | 350/503 |
| 3,229,576 | 1/1966 | Rees . | |
| 3,826,562 | 7/1974 | Baumgardner et al. | 350/622 |
| 3,998,532 | 12/1976 | Dykes . | |
| 4,063,815 | 12/1977 | Wilken et al. | 350/617 |
| 4,277,142 | 7/1981 | Gardner . | |
| 4,395,093 | 7/1983 | Rosendahl et al. . | |

FOREIGN PATENT DOCUMENTS

878162 8/1971 Canada .
283493 4/1915 Fed. Rep. of Germany ...... 350/542

Primary Examiner—Jon W. Henry
Attorney, Agent, or Firm—Neuman, Williams, Anderson & Olson

[57] ABSTRACT

The invention provides a viewing system which provides for a substantially continuous and unobstructed horizontal field of view over a desired viewing angle. The system comprises a plurality of entrance plane reflecting surfaces, each of which functions to reflect a field of view defined by an entrance aperture and a plurality of exit plane reflecting surfaces aligned with and spaced from each of said first reflecting surfaces for receiving a reflected view therefrom and for reflecting the view through an exit aperture to an observer. The entrance and exit reflecting surfaces are retained in fixed relationship. The number and width of said entrance apertures are such that the sum of all of the angles in azimuth subtended by all of the entrance apertures on a projected horizontal plane from a fixed reference point exceeds the angle in azimuth subtended by the system as a whole.

15 Claims, 12 Drawing Figures

LINE OF SIGHT OF OBSERVER LOCATED IN CENTER OF CUPOLA

OBSTRUCTED FOV

PANORAMIC UNITY VISION SYSTEM

This invention relates to improvements in the art of indirect viewing.

Unity periscopes, vision blocks and other unity viewing systems are used in a variety of applications, such as, for example, in armored military vehicles such as tanks. Viewing by means of periscopes enables an occupant of a tank, for example, to achieve a limited field of view from inside the tank without exposure. A periscope basically comprises an elongated housing with plane reflecting surfaces near each end thereof. The reflecting surfaces are disposed for reflecting views from outside the vehicle or other structure, by means of the double reflection, to an observer. The plane reflecting surfaces are often disposed parallel to one another in order to displace the line of sight transversely and not angularly.

The instantaneous horizontal field of view (FOV) of known periscope devices is determined primarily by the widths of the entrance and exit apertures, the optical distance between these apertures and the location of the observer's eye. The instantaneous field of view (FOV) is defined as the field of view obtained at a single fixed observation point, allowing for rotation of the eye about this point but not the translation of the eye's position. The extreme field of view of a periscope is defined by the angle of the ray which is limited by opposing corners or edges of the entrance and exit apertures and movement of the observer's eye is necessary in order to observe this extreme field of view. The total extreme field of view is the performance measure which is customarily used in describing a conventional periscope, and should not be confused with instantaneous field of view. The given extreme field of view is often unrealistically large because there is no assurance that the observer will be able to position the eye as is necessary because of some physical restraint or obstruction due to the location of the periscope.

Because periscopes contain an entrance and exit aperture separated optically by some distance, they form an apparent tunnel through which the observer sees. When the instantaneous field of view of a single periscope module is limited by the entrance aperture, one or both side walls of the tunnel will be seen by the observer. This is generally the case with conventional periscopes because their exit and entrance apertures are substantially the same size. When the entrance aperture is larger than the exit aperture there will be observation points at which the instantaneous field of view is limited only by the exit aperture, at which point the tunnel side walls will not be visible, and at this point the observer only perceives a window rather than a tunnel. Obviously, one could shorten the exit aperture in a conventional ring of periscopes to hide the tunnel, but there would be no advantage to the observer because he will simply be trading one type of visual blockage for another.

Wide-angle coverage using conventional periscopes has typically been attempted by arranging a plurality of periscopes side-by-side along an arc. With such arrangement of conventional periscopes, a continuous 360° field of view can never by achieved due to inherent visual obscuration which exist between them. That is, because one or both side walls of each of the periscopes will always be visible, these visible side walls will act as visual blockages.

It is a major object of this invention to provide a significantly improved indirect viewing system with respect to reducing or eliminating obstructions in the horizontal field of view as are inherent in known indirect viewing systems.

It is another object of the invention to provide an indirect viewing system which affords a substantially continuous non-obstructed field of view of desired horizontal angularity, including a field of view embracing 360°.

The new and improved viewing system of this invention comprises a plurality of first or entrance reflecting surfaces and a plurality of last or exit reflecting surfaces aligned with and spaced from the first reflecting surfaces; each of the reflecting surfaces being capable of reflecting optical wavefronts. Associated with each of the first entrance reflecting surfaces are entrance apertures through which light passes and which defines the field of view to be reflected from the reflecting surface. Similarly, exit apertures are associated with the last exit reflecting surfaces through which the observed view is reflected to an observer. The entrance and exit viewing apertures may be formed in whole or in part by a housing structure or other structures or the entrance and exit viewing apertures may be defined by the dimensions of the reflecting surfaces themselves as is the case when the reflecting surfaces are free standing and no extraneous structure limits or defines the view encompassed by the reflecting surfaces.

The entrance and exit reflecting surfaces are arranged to form a pair by virtue of which a view is reflected from the entrance reflector to an exit reflector and to an observer. Each pair of the entrance and exit reflecting surfaces are so arranged as to reflect views of finite angularity and are so arranged that the fields of view through each complement each other, providing optimum viewing conditions for an observer. The widths and number of entrance apertures and associated entrance reflectors employed are such that the sum of viewing angles subtended by all the entrance reflectors on a projected horizontal plane from a fixed reference point exceeds the angle subtended by the entire system, from the same reference point projected on a horizontal plane. Immediately adjacent entrance apertures and entrance reflecting surfaces are arranged so as not to interfere with the field of view encompassed by one another. Thus, immediately adjacent entrance apertures and entrance reflecting surfaces are disposed at different radial distances from an observation point, and at different vertical elevations from one another. Alternatively, immediately adjacent entrance apertures and entrance reflecting surfaces can be disposed at different radial distances but in the same horizontal plane, in which case the entrance reflecting surfaces lying at a greater radial distance from the set point of observation are beam splitting surfaces which permit part of the optical intensity from the field of view to reach an adjacent reflecting surface lying at a lesser radial distance.

The first or entrance reflecting surfaces and the last or exit reflecting surfaces are held in spaced relationship by a suitable structure or structures so that optical wavefronts are reflected from the entrance reflectors to the exit reflectors and to the eye of an observer. For simplicity, such housing structures have not been shown in the drawings but can be elongated, tubular, square or rectangular housing structures made of materials such as wood, plastic or metal as known in the art. The interior surfaces of the housing structure should have surfaces which give minimal reflection of light so as to avoid interference with the reflective and refractive functions of the paired entrance and exit reflecting surfaces. In lieu of a separate housing for each pair of entrance and exit reflectors, these reflectors can be attached to and held by the structure in which the viewing system is utilized. For example, the entrance reflectors can be secured in proper position exteriorly of a tank, such as on a tank turret, while the exit reflectors can be held in secured position within the interior of the vehicle. It will be appreciated that various means can be employed for retaining the entrance and exit reflectors in fixed relationship. When the field of view of the entrance and exit reflectors is not restricted by a separate housing structure or by any other structure, the reflectors themselves form the entrance and exit apertures, the size of which depends upon the dimensions of the reflectors.

Thus, the invention provides a viewing system which provides for a substantially continuous and unobstructed horizontal field of view over a desired viewing angle. The system comprises a plurality of entrance plane reflecting surfaces, each of which functions to reflect a field of view defined by an entrance aperture and a plurality of exit plane reflecting surfaces aligned with and spaced from each of said first reflecting surfaces for receiving a reflected view therefrom and for reflecting the view through an exit aperture to an observer. The entrance and exit reflecting surfaces are retained in fixed relationship. The number and width of said entrance apertures, which define the field of view reflected by the entrance reflectors, are such that the sum of all of the angles in azimuth subtended by each of the entrance apertures on a projected horizontal plane from a fixed reference point exceeds the angle in azimuth subtended by the entire system.

The principles and advantages of the present invention will be readily apparent from the following detailed description taken in conjunction with the drawings wherein.

Figure 1:
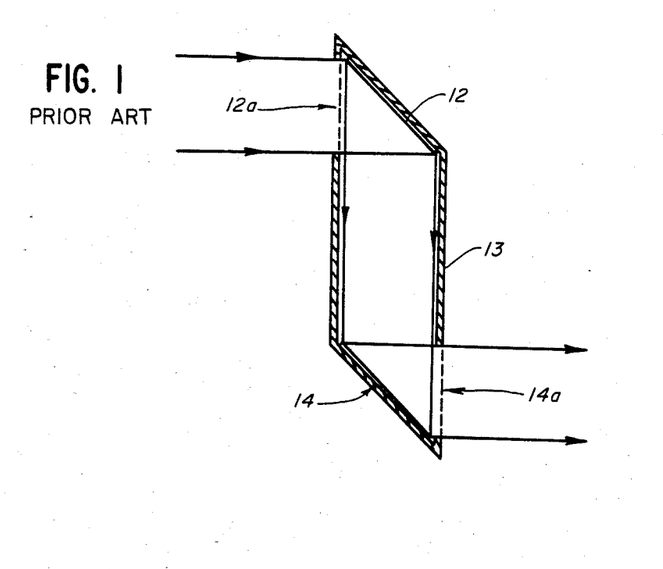
FIG. 1 is a simplified schematic view showing an external reflecting surface or mirror and an internal reflecting surface or mirror as arranged in a conventional periscope.
Figure 2:
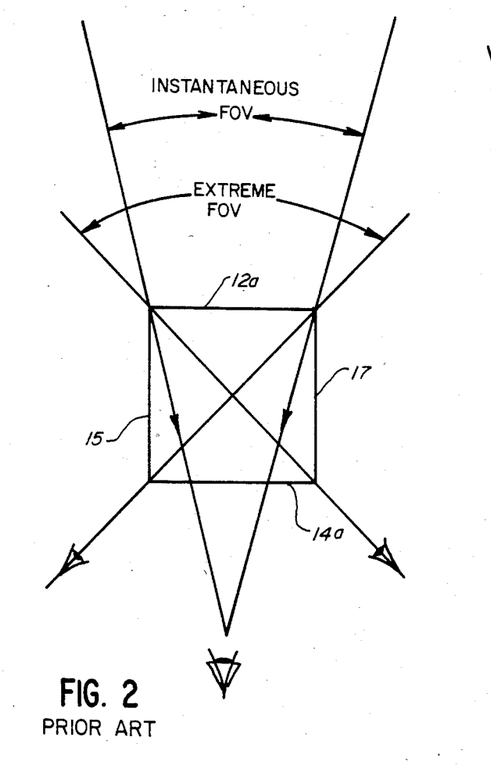
FIG. 2 is a schematic tunnel diagram, such as are known in the art and substantially represents a cross-section of the apparent tunnel through which the observer sees. The tunnel diagram of FIG. 2 represents a conventional periscope in which the entrance aperture is not substantially larger in size than the exit aperture.
Figure 3:
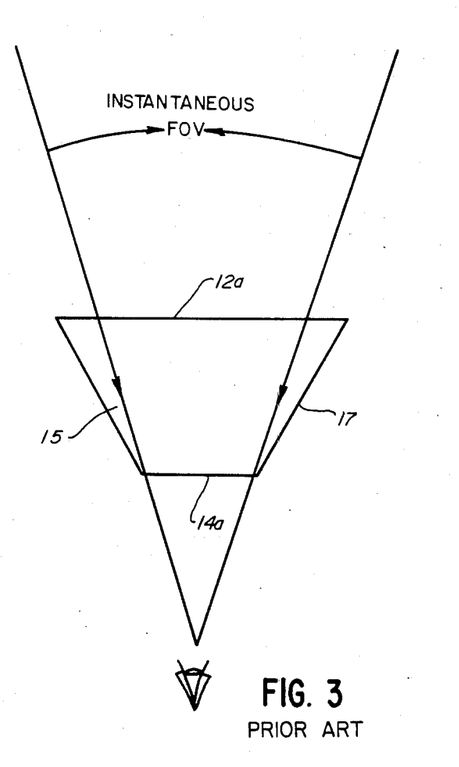
FIG. 3 is a schematic tunnel diagram illustrating the "window" vision effect obtained with a conventional periscope in which the entrance aperture is substantially larger in size than the exit aperture.

Referring to FIG. 1, which is a schematic illustration of a conventional periscope having an entrance reflecting surface 12 and an exit reflecting surface 14, entrance aperture 12a and exit aperture 12b are provided in the periscope housing 13 with the view through the periscope being transmitted as shown by the arrows. As illustrated in FIG. 2, when the instantaneous field of view is limited by the entrance aperture 12a not being wider than the exit aperture 14a, the interior side walls, designated with the numerals 15 and 17, of the periscope housing are visible. As a consequence, an observer utilizing the periscope perceives the view as if looking through a tunnel. On the other hand, when the entrance aperture is substantially wider than the exit aperture, there will exist a viewing region in which the horizontal field of view is limited only by the exit aperture so that the observer perceives the view as if looking through a window because obstructions, if any, have little depth. As illustrated in FIG. 3, the entrance aperture 12a is sufficiently wider than the exit aperture so that the exit aperture acts as the limiting aperture for the most used eye positions. If the observer's eye is moved sufficiently forward or far enough to either side of the position shown in FIG. 3, the interior side walls 15 and 17 of the periscope housing may become visible.

Figure 4:
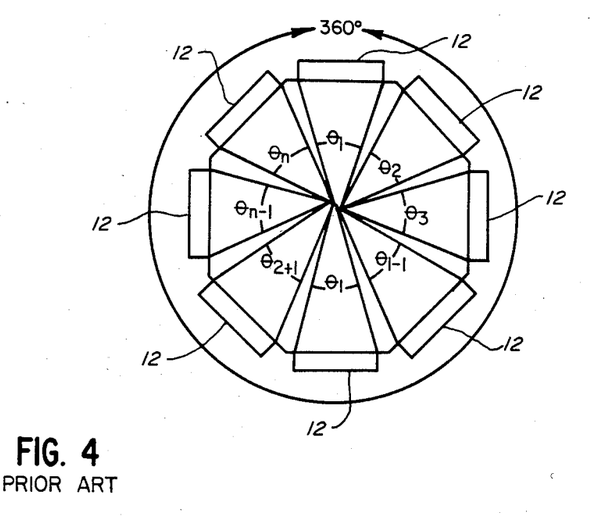
FIG. 4 is a schematic plan view of a plurality of conventional periscopes as they might be disposed in an attempt to obtain a 360° field of view. Illustrated in this figure are the angles subtended by the entrance apertures with respect to a central reference point.
Figure 5:
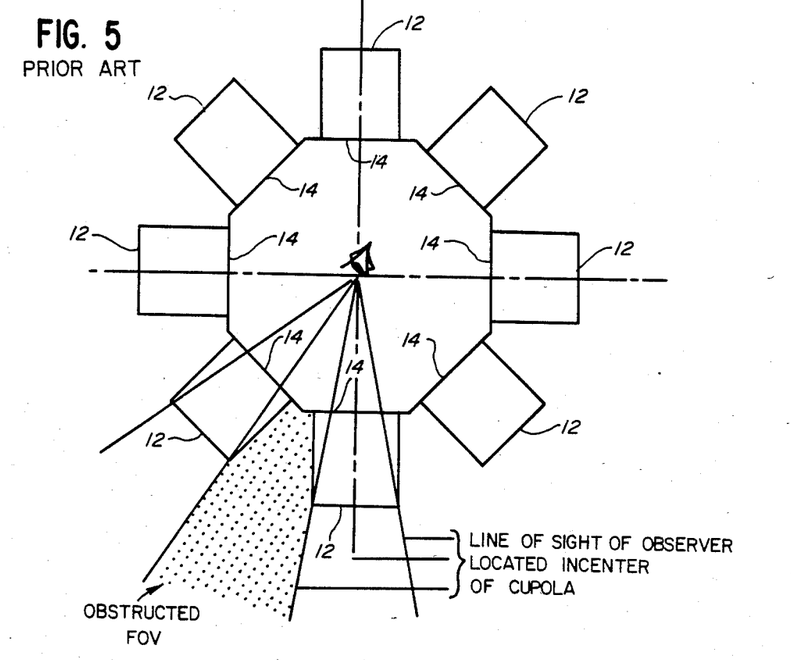
FIG. 5 is a view showing substantially unfolded tunnel diagrams associated with each periscope arranged as in FIG. 4. This figure illustrates the instantaneous field of view the observer sees through each periscope and the obstruction between periscopes.

Wide-angle coverage using conventional periscopes has typically been attempted by arranging periscopes side-by-side along an arc. The arc becomes a circle if 360° coverage is desired. Obviously, optimum performance with regard to horizontal field of view is achieved when the periscopes are positioned as closely as possible to each other. Unfortunately, all such arrangements, even those designed for optimum performance, exhibit major blockages in the instantaneous field of view. FIG. 4 shows a plan view of a conventional system of periscopes arranged to cover a 360° field of view. It will be appreciated that the summation of the angles $(\theta_1 + \theta_2 + \theta_3 \text{---} + \theta_n)$ subtended by all the entrance apertures 12 is less than 360° and that even if the entrance apertures were butted against each other, the sum of their subtended angles could not exceed 360°. The instantaneous horizontal field of view provided by each entrance aperture in FIG. 5 is less than the angle subtended by the same entrance aperture in FIG. 4 because FIG. 5 represents an unfolded tunnel view thereof wherein the entrance apertures 12 are moved farther away from the reference point. Therefore, even for the limiting case of butted entrance apertures, there will remain major blockages in the field of view between periscopes. Visual blockages will be present for all observation eye positions although the size and shape of each blockage will vary with changes in observer position.

Figure 8:
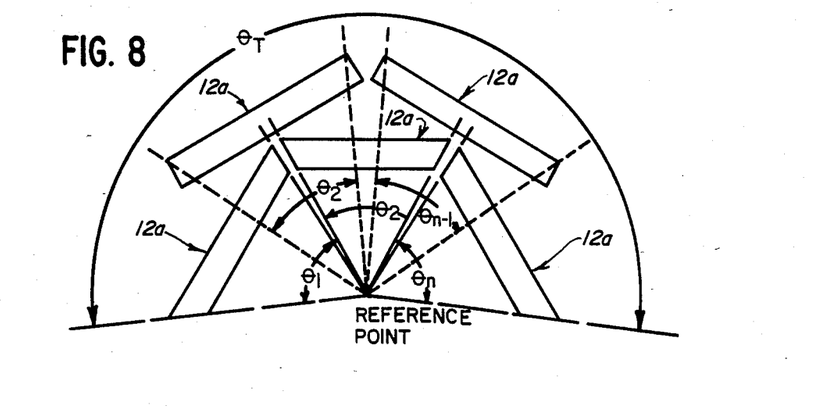
FIG. 8 is a schematic view illustrating that the sum of the subtended angles of a plurality of entrance apertures arranged in accordance with the invention exceeds the angle subtended by the system.

The present invention eliminates the disadvantages and problems discussed above. In accordance with this invention, a unity power viewing system is provided which provides for an unobstructed field of view over any desired angularity including a field of view embracing 360°. The new viewing system comprises a plurality of first entrance reflecting surfaces and associated entrance apertures and a plurality of exit reflecting surfaces and associated exit apertures. The entrance apertures and first reflecting surfaces are arranged in a specified manner so as to reduce or eliminate visual obstructions over a given horizontal viewing angle. All reflecting surfaces and apertures are retained in set position by suitable retaining means. Cooperating pairs of reflecting surfaces along with associated apertures can be considered as forming reflecting units. The exit apertures in this viewing system are preferably positioned largely along a common horizontal plane in such manner that an observer does not have to raise or lower his head in order to look from one exit aperture to an adjacent exit aperture. The entrance apertures are of such width and number that the sum of all the angles in azimuth subtended individually by said entrance apertures as measured from a single observation point exceeds the angle in azimuth subtended by the left edge of the left most entrance aperture and the right edge of the right most entrance aperture in the system as measured from the same observation point. This is to say, the sum of the angles subtended individually by all of the entrance apertures, as projected on a horizontal plane, exceeds the angle subtended by the system as a whole. In the limiting case, this sum of individual subtense angles will exceed 360°. For a system employing n entrance apertures and entrance reflecting surfaces, this can be expressed mathematically as follows:

$$\theta_1 + \theta_2 + \ldots + \theta_i + \ldots + \theta_n > \theta_T,$$

where n is the number of entrance apertures
$\theta_i$ is the angle subtended by the $i^{th}$ entrance aperture
$\theta_{96}$ is the angle subtended by the system as a whole
The angles involved are illustrated graphically in FIG. 8.

The subtended angles referred to in the above equation are to be distinguished from instantaneous fields of view. The subtended angles referred to are derived from the physical system as projected on a horizontal plane, without "unfolding" the optical path of the system. When the system is unfolded to reveal the apparent tunnels seen by the observer, the entrance aperture is moved radially away from the observation point, as in, for example, going from FIG. 4 to FIG. 5, so that the angles illustrated in FIG. 5 are instantaneous fields of view. Because the entrance aperture will appear to the observer to be located at a further radial distance than it actually is, the instantaneous horizontal field of view subtended by the aperture is inherently smaller than the angle physically subtended by the aperture. Therefore, in order to eliminate obstructions in the horizontal field of view provided by a plurality of unity periscopes, it is necessary that the above equation be satisfied.

The reflecting surfaces or reflectors utilized in this invention can be front surface mirrors, back surface mirrors, prisms or any other elements capable of providing plane reflection of optical wavefronts. The reflecting surfaces can be formed of materials such as silver, aluminum, gold or any other reflective material known in the art.

Figure 6:
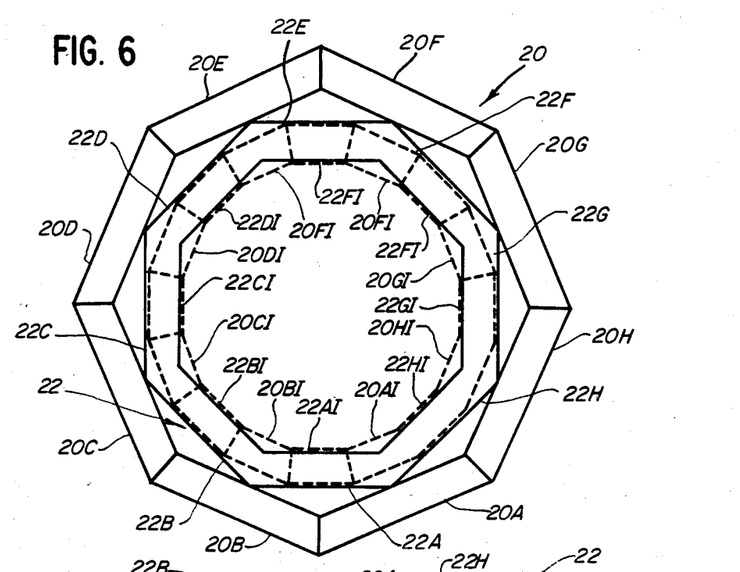
FIG. 6 is a schematic plan view of a viewing system in accordance with this invention wherein a plurality of entrance reflecting surfaces are so arranged as to provide a continuous instantaneous field of vision over a 360° range.
Figure 7:
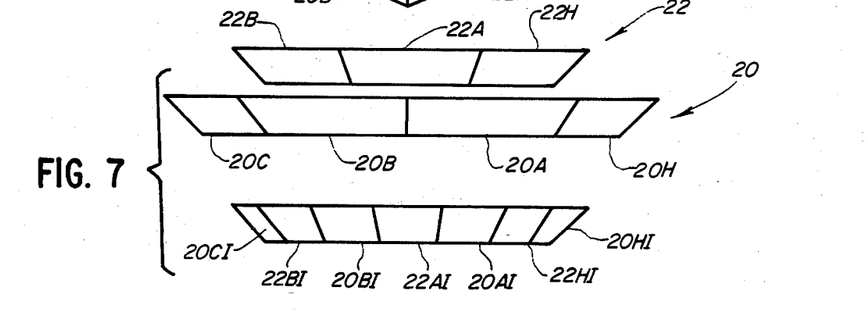
FIG. 7 is an elevational view of the viewing system of FIG. 6.

One specific preferred embodiment of this invention comprising an array of entrance reflecting surfaces or mirrors, with paired exit reflecting surfaces or mirrors, is illustrated in FIGS. 6 and 7. In these drawings, the view reflected by the entrance and exit reflecting surfaces is not limited or restricted other than by the dimensions of the surfaces themselves. Thus, the entrance and exit reflecting surfaces themselves form entrance and exit viewing apertures respectively. As shown, a plurality of entrance mirrors are arranged in two circular rings designated with the numerals 20 and 22, which are concentric with the mirrors in ring 20 reflecting a field of view which overlaps the fields of view reflected by two adjacent entrance mirrors in the inner ring 22. In the illustrated embodiment there are eight entrance mirrors in the inner ring 22 and also eight entrance mirrors in the outer ring 20, with outer ring mirrors 20A and 20B being disposed so as to overlap a portion of the field of view afforded by inner ring mirror 22A. In like manner, outer ring mirrors 20B and 20C partially overlap the field of view afforded by inner ring mirror 22B. This same angular relationship is repeated for succeeding mirrors in both the outer and inner rings. While eight mirrors in each of the rings 20 and 22 are shown in FIG. 6, it is to be understood that a greater or lesser number of entrance mirrors can be employed as is desired. Thus, if each of the entrance mirrors are smaller in size so as to provide a smaller field of view, a greater number of entrance mirrors will be required to obtain complete 360° coverage. The converse is also true. Likewise, if it is desired to achieve less angular coverage, only a sufficient number of entrance mirrors are employed in the concentric ring so as to provide a continuous, unobstructed field of view over the desired range, say, for example, 180°, in which case the number of entrance mirrors in each ring can be reduced by one-half.

Also forming the viewing system illustrated in FIGS. 6 and 7 is a ring of exit mirrors which are paired with each of the entrance mirrors in the rings 20 and 22. Thus, for each of the entrance mirrors 20A through 20H illustrated in FIG. 6, there are paired parallelly aligned exit mirrors. When the paired entrance and exit mirrors are parallelly aligned, there is no angular deviation in the line of sight and this alignment is thus preferred. However, there can be some deviation in alignment, if desired. For example, the exit mirrors can deviate from parallel alignment with the entrance mirrors a small amount to accomplish deviation of the line of sight, if desired. Such deviation may be desirable in the case where the eye of the observer, for one reason or another, cannot be planarly aligned with the exit mirrors. For example, if the eye of an observer is below the level of the exit mirrors, it may be desirable to provide for a downward deviation in the line of reflection from the exit mirrors and the exit mirrors can be angularly adjusted to achieve this desideratum. The disadvantage in configuring the reflecting surfaces so as to angularly deviate the line of sight is that the views through adjacent viewing units will be rotated with respect to each other, thus producing contiguous, rather than continuous, field coverage. The advantages over conventional indirect viewing systems with respect to reducing obstructions in the vision field will still be significant.

It is generally preferred that the apertures and reflecting surfaces in this invention be so arranged as to provide a large horizontal field of view which is totally free of visual blockages, and this desideratum can, in most cases, be substantially achieved. However, there may exist physical or constructional constraints imposed by the environment in which the viewing system of this invention is to be incorporated which will limit the design to the point that small visual blockages between reflecting units will result. In such instances this invention can still substantially reduce blockages in horizontal field of view, as compared to conventional indirect viewing systems.

Figure 11:
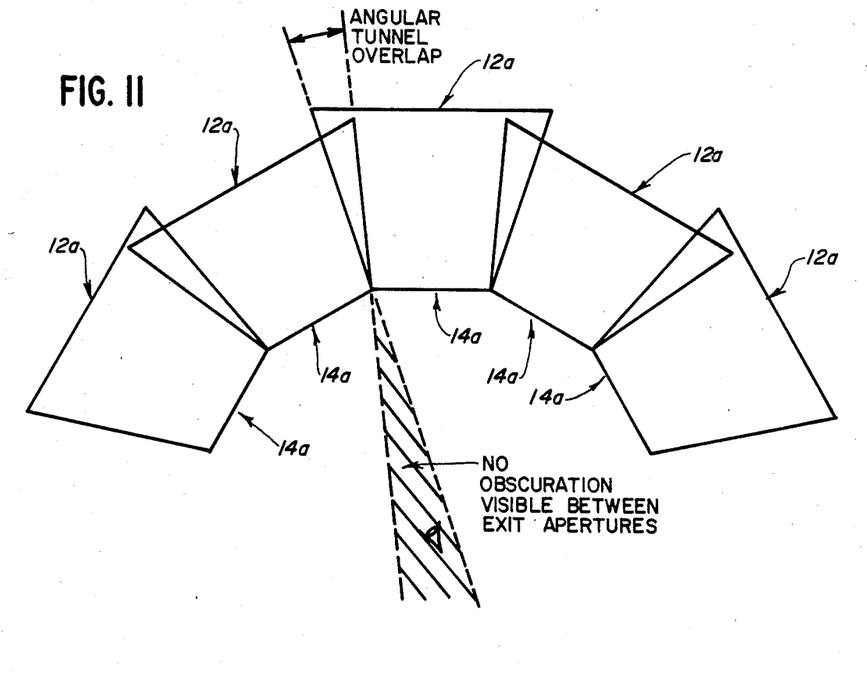
FIG. 11 schematically shows the tunnel diagrams resulting from the placement of a plurality of first and second reflecting surfaces in accordance with this invention. This figure illustrates the overlap of the apparent tunnels leading to an unobstructed field of vision.

FIG. 11 illustrates the continuous and unobstructed view achieved with the new and improved vision system. The tunnel diagrams of FIG. 11 show that the exit apertures 14a (formed by an exit reflector) are butted against each other without intermediate structure, and the entrance apertures 12a (formed by an entrance reflector) are substantially wider than their paired exit apertures. Continuous viewing is provided because the apparent tunnels associated with adjacent exit apertures overlap, which provides the marked area in which no tunnel side wall is visible. As long as the apparent tunnels overlap, there will be a region of continuous viewing.

To allow the sum of the angles subtended by the individual entrance apertures to exceed the angle subtended by the system, it is necessary that the entrance apertures associated with adjacent entrance apertures be located at a different radial distance from the observer and that they lie on a different horizontal plane. For example, in FIG. 7 an upper ring of external mirrors 22 are located inside and at a more elevated horizontal plane than a lower ring of external mirrors 20. This allows the mirrors in the upper ring 22 to reflect views unobstructed by the lower ring 20. Mirrors in the internal ring, labeled 20CI, 22DI, 20BI, etc., are alternately paired with mirrors from each of the external rings.

Figure 9:
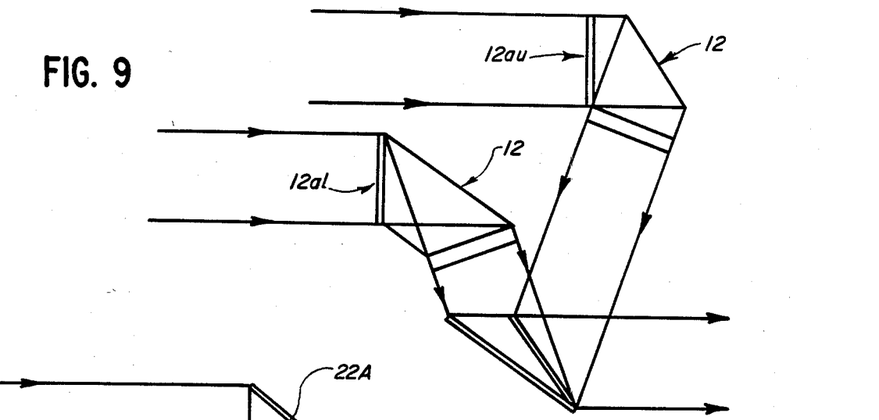
FIG. 9 is a schematic representation showing the positioning of paired first and last reflecting surfaces and entrance apertures according to one embodiment of the viewing system of this invention.
Figure 10:
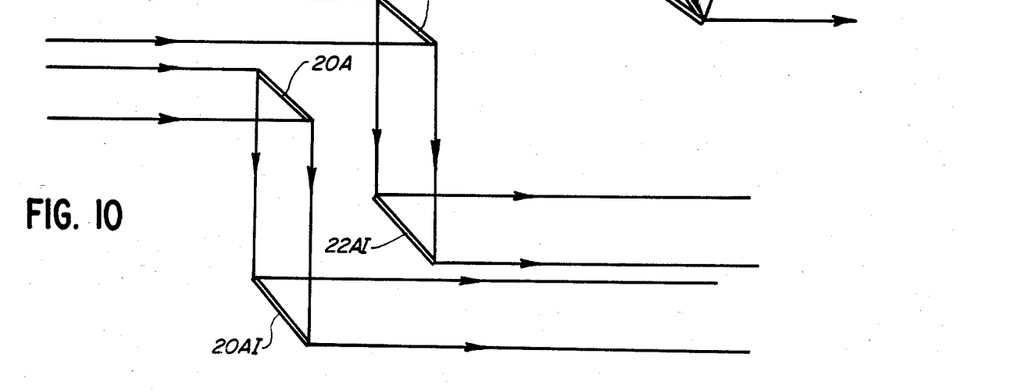
FIG. 10 is a simplified schematic representation showing the positioning of paired first and last reflecting surfaces according to another embodiment of the viewing system of this invention.

According to another embodiment, shown in FIG. 9, the entrance apertures of one set of periscope modules 12au, is located physically above and behind a second set of entrance apertures 12al. In this configuration the entrance reflecting surfaces 12 are contained in prisms made of material transparent to optical radiant energy, as is known in the art. In all cases, the angle of disposition of the exit reflecting surface will be complementary with a paired first reflecting surface to receive a reflected view therefrom and in turn reflect the view to an observer.

In the viewing system of this invention, the optical space of adjacent reflecting units is in part shared. This sharing of optical space is in essence an interlacing of the units to form one continuous unit or system.

There is a large visual blockage between conventional periscopes, so any parallax between adjacent units is unimportant. In the viewing system of the present invention, the exit apertures and fields of view will generally be touching, so the phenomenon of optical parallax is to be considered. Because of the folding of optical paths, the relative positions of entrance apertures, and differing tunnel lengths, there will in general be longitudinal, horizontal and vertical parallax between adjacent reflecting units. The longitudinal parallax will be imperceptible by a human observer for objects more than a few feet away, and thus will not pose a problem. Horizontal parallax will normally be negligible for a two-eyed observer because as the eyes straddle the two exit apertures they will automatically adjust to compensate. When using a non-visual system with a large entrance aperture, it may be necessary to position the device so that the pupil is not split. Vertical parallax will be the most troublesome because it cannot be compensted for by the eyes. Therefore, when viewing near objects the observer may want to position his head to allow looking through the same periscope with both eyes. This should not be a problem because the movement needed will be small ($\sim \frac{1}{2}$ his eye separation) and he will do this instinctively.

Thus, according to another preferred embodiment of the invention, vertical parallax is eliminated by disposing the entrance mirrors in each of the rings 20 and 22 in the same horizontal plane, but circumferentially offset and in overlapping relationship as previously discussed. In this embodiment the entrance mirrors utilized in the outermost ring 20 can be beamsplitting mirrors which permits the field of view encompassed thereby to reach the exit mirrors on ring 22 (FIG. 6). Such beamsplitting devices are well known in the art.

If desired, one set of reflecting units can be replaced by a set of vision blocks. Vision blocks are well known in the art and are in essence thick windows or tunnels, filled with refractive material and containing an entrance and an exit aperture, but no reflecting surfaces.

Figure 12:
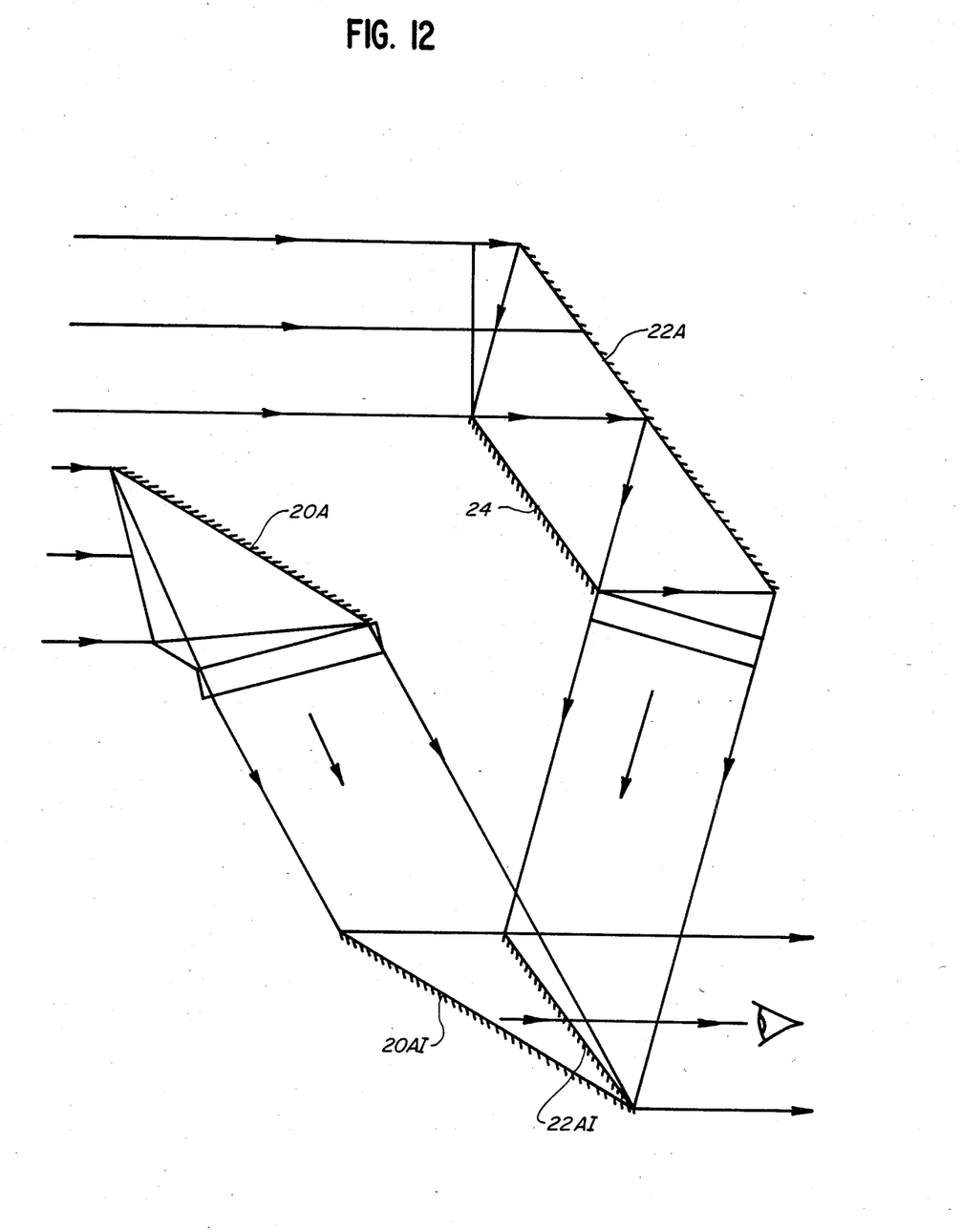
FIG. 12 is a schematic representation illustrating an arrangement which incorporates a plurality of reflecting surfaces by virtue of which the optical wavefront is reflected several times before reaching the observer's eye.

In addition to the entrance and exit reflecting surfaces, the viewing system can employ multiple intermediate reflecting surfaces as illustrated in FIG. 12. In FIG. 12, numeral 24 designates an intermediate reflecting surface with the view being reflected as shown by the arrows.

The viewing system of this invention is not limited to use as a visual, (i.e. direct viewing by the observer's eye), although it is particularly well suited to this application because it allows for stereoscopic vision and provides a wide horizontal field of view accommodating peripheral vision. In addition, a viewing system according to this invention can be employed as a viewpoint for any type of imaging detector. Also, the viewing system of the invention can be adapted to operate in any portion of the electromagnetic spectrum by using the appropriate detector and by using refractive and reflective materials suitable for use in the portion of the spectrum of interest. Thus, for example, representative materials for use as refractive components in the infrared or "thermal" imaging region of the spectrum include zinc selenide, zinc sulfide, germanium and the like. Other materials suitable for use in this and other portions of the spectrum are known to the art.

The advantages of the present invention are significant. Thus, the system can provide an unobstructed panoramic view with no blind spots between adjacent views. The system reduces observer stress caused by restricted instantaneous fields of view experienced with conventional periscopes and eliminates or substantially reduces the "tunnel" vision effect of conventional periscopes. The new system effectively reduces head movement by an observer since obstructions in the instantaneous field of view do not exist.

Those modifications and equivalents which fall within the spirit of the invention are to be considered a part thereof.

What is claimed is:

1. A viewing system which provides for a substantially continuous and unobstructed horizontal field of view over a desired viewing angle which comprises:
    a plurality of entrance reflecting surfaces arranged in circumferential relationship, each of which functions to reflect from a fixed reference point a field of view which overlaps the field of view of an adjacent entrance reflecting surface,
    a plurality of exit reflecting surfaces aligned with and spaced from each of said first reflecting surfaces for receiving a reflected view therefrom and for reflecting the view to an observer,
    the number and width of said entrance reflecting surfaces being such that the sum of all of the angles in azimuth as projected on a horizontal plane subtended by each of the said entrance reflecting surfaces as measured from a fixed reference point exceeds the angle in azimuth subtended by the system as a whole, and
    means for retaining said entrance and exit reflecting surfaces in fixed relationship.

2. A viewing system according to claim 1 wherein the reflecting surfaces are front surface mirrors or back surface mirrors or prisms.

3. A viewing system according to claim 1 wherein the entrance reflecting surfaces are wider than the exit reflecting surfaces.

4. A viewing system according to claim 1 wherein the entrance reflecting surfaces are arranged in two concentric arcs with the entrance reflecting surfaces in one arc lying in a different horizontal plane than the entrance reflecting surfaces in the other arc which are immediately adjacent thereto.

5. A viewing system according to claim 4 wherein the concentric arcs extend 360°.

6. A viewing system according to claim 1 wherein said entrance reflecting surfaces are arranged in two concentric arcs with the entrance reflecting surfaces in one arc lying in the same horizontal plane as the entrance reflecting surfaces in the other arc and wherein the reflecting surfaces in the outermost arc are beam-splitting reflecting surfaces.

7. A viewing system according to claim 6 wherein the concentric arcs extend 360°.

8. A viewing system according to claim 1 wherein the exit reflecting surfaces are disposed in substantially the same horizontal plane.

9. A viewing system according to claim 1 wherein a plurlaity of spaced complementary reflecting surfaces are disposed intermediate of the said entrance and exit reflecting surfaces.

10. A viewing system according to claim 1 wherein the said entrance and exit reflecting surfaces are formed of materials which reflect radiant energy in the desired portion of the electro-magnetic spectrum.

11. A viewing system according to claim 1 wherein the said entrance and exit reflecting surfaces are formed of materials which reflect infra-red energy radiations.

12. A viewing system according to claim 1 wherein the said entrance and exit reflecting surfaces are formed of materials which reflect ultraviolet energy radiations.

13. A viewing system which provides for a substantially continuous and unobstructed horizontal field of view over a desired viewing angle which comprises:
    a plurality of entrance reflecting surfaces arranged in circumferential relationship, each of which functions to reflect from a fixed reference point a field of view which overlaps the field of view of an adjacent entrance reflecting surface,
    the entrance reflecting surfaces which are paired to adjacent exit reflecting surfaces lie on different horizontal planes and at different radial distances from a fixed central point of observation,
    a plurality of exit reflecting surfaces aligned with and spaced from each of said first reflecting surfaces for receiving a reflected view therefrom and for reflecting the view to an observer,
    the number and width of said entrance reflecting surfaces being such that the sum of all of the angles in azimuth as projected on a horizontal plane subtended by each of the said entrance reflecting surfaces as measured from a fixed reference point exceeds the angle in azimuth subtended by the system as a whole, and
    means for retaining said entrance and exit reflecting surfaces in fixed relationship.

14. A viewing system which provides for a substantially continuous and unobstructed horizontal field of view over a desired viewing angle which comprises:
    a plurality of entrance reflecting surfaces arranged in circumferential relationship, each of which functions to reflect from a fixed reference point a field of view defined by an associated entrance aperture which is defined by the dimensions of the entrance reflecting surfaces or by other structure, the field of view reflected by each entrance reflecting surface overlapping the field of view of an adjacent entrance reflecting surface,
    a plurality of exit reflecting surfaces aligned with and spaced from each of said first reflecting surfaces for receiving a reflected view therefrom and for reflecting the view to an observer through an associated exit aperture which is defined by the dimensions of the exit reflecting surfaces or by other structure,
    the number and width of said entrance apertures being such that the sum of all of the angles in azimuth as projected on a horizontal plane subtended by each of the said entrance apertures as measured from a fixed reference point exceeds the angle in azimuth subtended by the system as a whole, and
    means for retaining said entrance and exit reflecting surfaces and said entrance and exit apertures in fixed relationship.

15. A viewing system which provides for a substantially continuous and unobstructed horizontal field of view over a desired viewing angle which comprises:
    a plurality of entrance reflecting surfaces arranged in circumferential relationship, each of which functions to reflect from a fixed reference point a field of view which overlaps the field of view of an adjacent entrance reflecting surface,
    a plurality of exit reflecting surfaces aligned with and spaced from each of said first reflecting surfaces for receiving a reflected view therefrom and for reflecting the view to an observer,
    a vision block being disposed between adjacent entrance reflecting surfaces and exit reflecting surfaces, the number and width of said entrance reflecting surfaces and vision blocks being such that the sum of all of the angles in azimuth as projected on a horizontal plane subtended by each of the said entrance reflecting surfaces and vision blocks as measured from a fixed reference point exceeds the angle in azimuth subtended by the system as a whole, and means for retaining said entrance and exit reflecting surfaces and said vision blocks in fixed relationship.

* * * * *